UNITED STATES PATENT OFFICE.

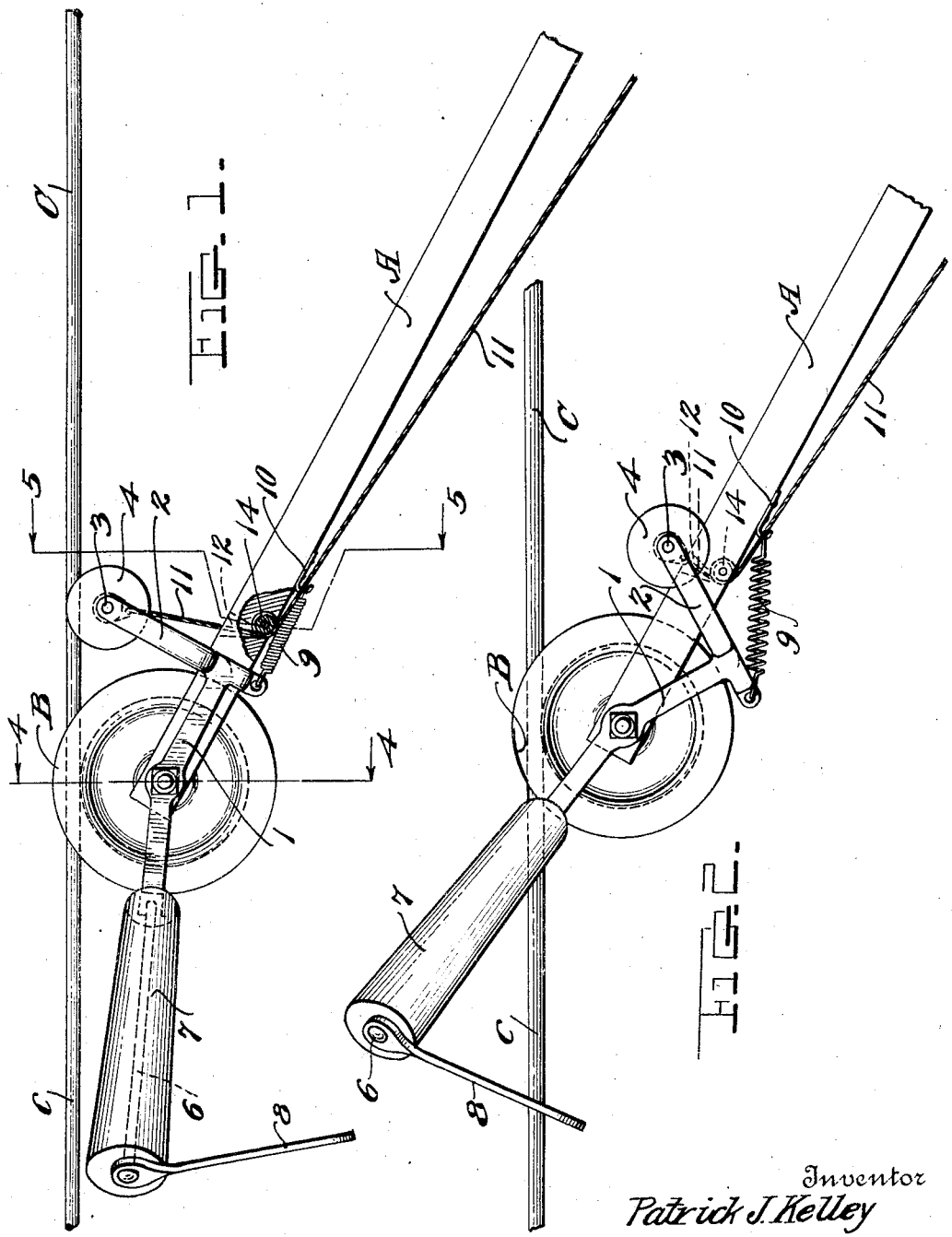

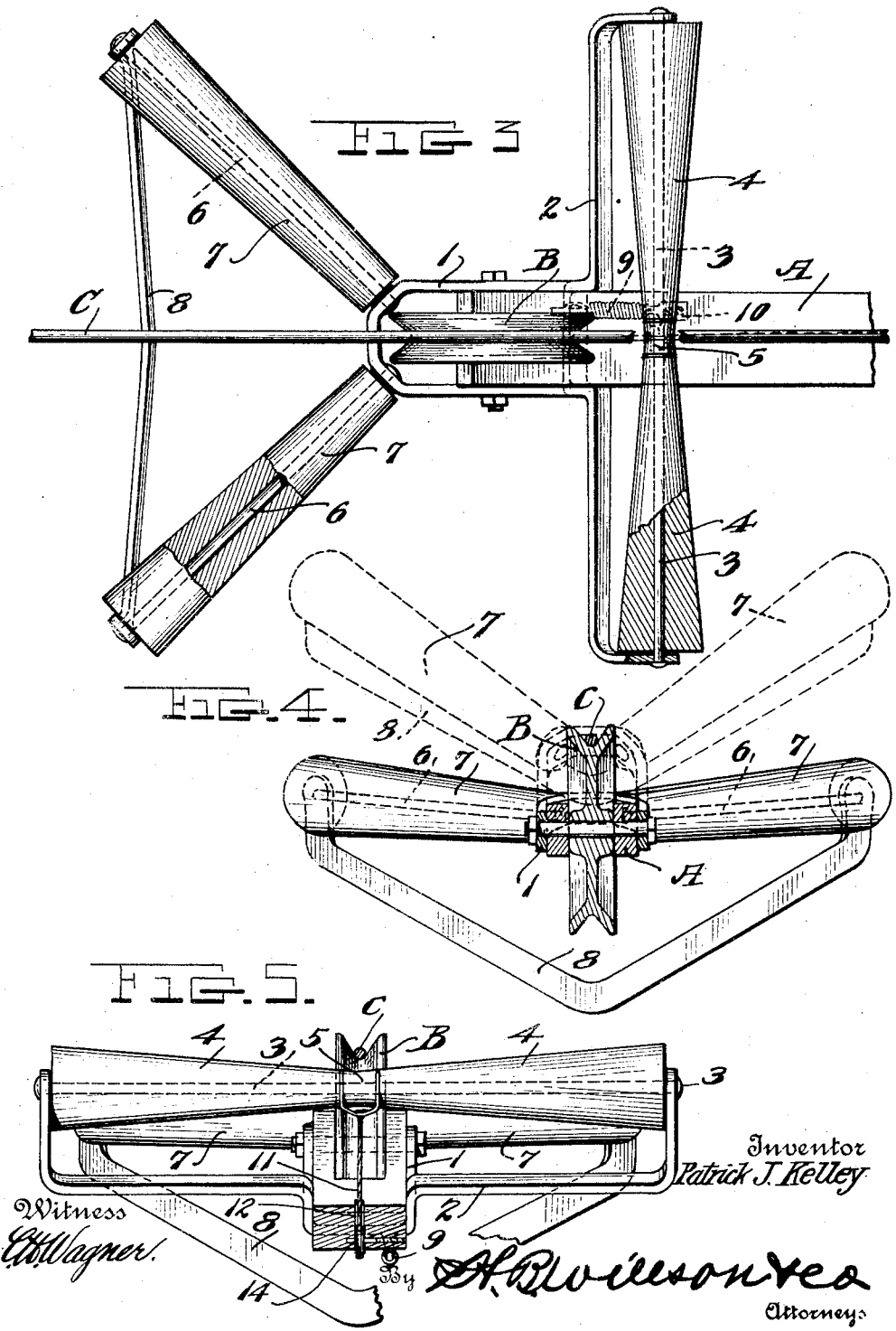

PATRICK JOSEPH KELLEY, OF DETROIT, MICHIGAN.

TROLLEY GUARD AND FINDER.

1,391,191.   Specification of Letters Patent.   Patented Sept. 20, 1921.

Application filed June 14, 1921. Serial No. 477,497.

*To all whom it may concern:*

Be it known that I, PATRICK J. KELLEY, a citizen of the United States, residing at Detroit, in the county of Wayne and State of Michigan, have invented certain new and useful Improvements in Trolley Guards and Finders; and I do declare the following to be a full, clear, and exact description of the invention, such as will enable others skilled in the art to which it appertains to make and use the same.

This invention relates to an improved trolley guard and finder for overhead trolleys.

The principal object of the invention is to generally improve upon devices of this class by the provision of one of extreme simplicity and durability which can be mounted on the existing trolley without necessitating any changes of the latter whatsoever, the construction and arrangement being such that the ends sought are very effectively accomplished and the device so arranged on the trolley that it does not interfere with guy wires at track crossings.

Another and very important object of the invention is to provide a device of this class which embodies a novel type of finder including spaced inwardly tapered divergent rollers which, when set into rotation, serve to effectively feed the line wire inwardly so that it can be easily and readily seated in the groove of the trolley wheel.

Other objects and advantages of the invention will be apparent during the course of the following description.

In the accompanying drawings forming a part of this specification and in which like numerals are employed to designate like parts throughout the same:

Figure 1 is a side elevation of a device constructed in accordance with this invention showing the guard in operative position.

Fig. 2 is a similar view showing the finder in its operative position.

Fig. 3 is a top plan view.

Fig. 4 is a sectional view taken on the plane of the line 4—4 of Fig. 1.

Fig. 5 is also a sectional view taken on the plane of the line 5—5 of Fig. 1.

In the drawings, the letter A designates a conventional type of trolley pole, B designates the wheel and C the line wire.

In carrying out the invention, I employ a frame 1, the same being substantially U-shaped and the side portions or arms of this U extending on opposite sides of the wheel and pole as shown, and being pivotally connected with these parts by the same bolt that serves as a pivot and connecting pin for the trolley wheel. These side portions of the frame are provided at their free ends with angular arms 2, the vertically directed portions of which have arranged between them, a shaft 3 on which a pair of inwardly tapered metallic rollers 4 are rotatably mounted, being spaced apart at their centers by means of an insulating sleeve 5 which likewise is arranged on the shaft 3.

Referring now to the opposite end of the frame, it will be seen that the U-shaped portion thereof carries a pair of spaced divergent pins which constitute shafts 6 and inwardly tapered rollers 7 are rotatably mounted on these shafts, the inner ends of the rollers being closely spaced and positioned rather close to the grooved periphery of the trolley wheel so that when swung up to operative position as disclosed in Fig. 2 they serve to engage the line wire and when in rotation feed it inwardly and seat it in the groove of the wheel. It is, of course, unnecessary that the rollers be in rotation to accomplish this end, as is obvious. A suitable U-shaped brace 8, if desired may be connected with the outer end of the shafts 6 for increasing the rigidity of the device and preventing spreading or displacement of these shafts. The device in addition to embodying the aforesaid parts, includes a coiled spring 9 which is connected to the frame in any suitable way and with a hook or the like 10 on the trolley pole, this spring serving to normally position the rollers 4 in operative positions, and at the same time, hold the remaining rollers 7 in inoperative position. It is yet to be pointed out that a cable 11 is connected to the frame and is passed through an opening 12 formed in the trolley pole A. Here, it may be stated that if desired, the pole can be equipped with a pulley 14 over which the cable may pass to reduce friction. It is understood that this cable 11 is designed to lead to the front or rear platform of the car to be conveniently operated by the motorman or conductor as desired.

The operation of the device is as follows: It is understood that under normal conditions, the spring 9, as already set forth, serves to hold the rollers 7 in inoperative position, and at the same time hold the remaining rollers 4 in operative position so that in case the trolley wheel jumps the line wire, the latter will engage either one or the other of the rollers 4 and current will be supplied through the pole as it does when the wheel is engaged with the line wire. These rollers and brackets are therefore constructed of suitable electricity conducting material. When it becomes desired to guide the line wire back into the groove of the trolley wheel B, the cable 11 is grasped and a downward pull is exerted thereon. In so doing, the frame 1 is swung about its pivot and the rear end thereof moved up to the position indicated in Fig. 2 wherein the rollers 7 are positioned to effectively guide the wire into the groove of the wheel as is obvious. The employment of rollers, as before indicated, is extremely advantageous in that when they are in rotation, they serve to feed wire inwardly, which result is not accomplished with an ordinary stationary arm guide as is ordinarily employed. It is of course understood that when the car is not in motion, the rollers 7 do not rotate, but at the same time, they will serve to guide the wire into engagement with the wheel just the same. As soon as the cable is released, the spring 9 serves to return the parts to their normal position.

A careful review of the description taken in connection with the drawings, will be found sufficient to enable persons skilled in the art to which the invention relates to obtain a clear understanding of the same. In view of this, a more lengthy and detailed description is deemed unnecessary.

In all probability the construction and arrangement herein shown and described will suffice to effectively accomplish the ends sought. However, I wish it to be understood that slight minor changes coming within the scope of the subjoined claims may be resorted to if desired.

I claim:

1. A finder for car trolleys comprising a bracket to be pivotally mounted on the trolley, said bracket including spaced divergent arms constituting journals, tapered rollers mounted on the latter for feeding the wire inwardly into the groove of the trolley wheel, and means for swinging said bracket on its pivots to render said rollers operative.

2. A combined guard and finder for car trolleys comprising a frame for pivotal mounting on the existing pivot bolt of the trolley wheel, spaced diverging tapered guide rollers carried by the frame in rear of said wheel, and alined horizontal tapered guard rollers carried by the frame in advance of the wheel.

3. A combined guard and finder for car trolleys comprising a frame having spaced side-portions disposed on opposite sides of the contact wheel and pivotally mounted on the journal pin of the latter, said frame including angular arms disposed in front of said wheel, a horizontal shaft connected to said arms, inwardly tapered and spaced guard rollers rotatably mounted on said shaft, diverging journals carried by the aforesaid side portions of the frame at the rear end of the latter, inwardly tapered rollers on said journals, a spring for normally holding the guard rollers in operative position and the guide rollers in inoperative position, and means for rendering the last named rollers operative.

In testimony whereof I have hereunto set my hand.

PATRICK JOSEPH KELLEY.